(12) United States Patent
Chau et al.

(10) Patent No.: US 8,701,190 B1
(45) Date of Patent: *Apr. 15, 2014

(54) INFERRING FILE AND WEBSITE REPUTATIONS BY BELIEF PROPAGATION LEVERAGING MACHINE REPUTATION

(71) Applicant: Symantec Corporation, Mountain View, CA (US)

(72) Inventors: Duen Hong Chau, Pittsburgh, PA (US); Adam Wright, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/677,914

(22) Filed: Nov. 15, 2012

Related U.S. Application Data

(63) Continuation of application No. 12/710,324, filed on Feb. 22, 2010, now Pat. No. 8,341,745.

(51) Int. Cl.
 *G06F 11/00* (2006.01)
 *G06F 7/04* (2006.01)
 *G06F 15/173* (2006.01)

(52) U.S. Cl.
 USPC ............... 726/23; 726/22; 726/24; 726/25; 726/26; 709/223

(58) Field of Classification Search
 None
 See application file for complete search history.

(56) References Cited

U.S. PATENT DOCUMENTS

| | | |
|---|---|---|
| 6,347,332 B1 | 2/2002 | Malet et al. |
| 6,556,989 B1 | 4/2003 | Naimark et al. |
| 7,197,539 B1 | 3/2007 | Cooley |
| 7,412,516 B1 | 8/2008 | Brown et al. |
| 7,472,420 B1 | 12/2008 | Pavlyushchik |
| 7,546,349 B1 | 6/2009 | Cooley |
| 7,562,304 B2 | 7/2009 | Dixon et al. |

(Continued)

FOREIGN PATENT DOCUMENTS

WO    WO 2009/076555 A2    6/2009

OTHER PUBLICATIONS

Archive of "Abaca Products > Filtering Technology," www.abaca. com, [Online] [Archived by http://archive.org on Oct. 24, 2006; Retrieved on Apr. 11, 2013] Retrieved from the Internet<URL:http://web.archive.org/web/20061024023812/http://www.abaca.com/product_technology.html>.

(Continued)

*Primary Examiner* — Cordelia Zecher
*Assistant Examiner* — Trang Doan
(74) *Attorney, Agent, or Firm* — Fenwick & West LLP

(57) ABSTRACT

The probability of a computer file being malware is inferred by iteratively propagating domain knowledge among computer files, related clients, and/or related source domains. A graph is generated to include machine nodes representing clients, file nodes representing files residing on the clients, and optionally domain nodes representing source domains hosting the files. The graph also includes edges connecting the machine nodes with the related file nodes, and optionally edges connecting the domain nodes with the related file nodes. Priors and edge potentials are set for the nodes and the edges based on related domain knowledge. The domain knowledge is iteratively propagated and aggregated among the connected nodes through exchanging messages among the connected nodes. The iteration process ends when a stopping criterion is met. The classification and associated marginal probability for each file node are calculated based on the priors, the received messages, and the edge potentials associated with the edges through which the messages were received.

17 Claims, 6 Drawing Sheets

(56) References Cited

U.S. PATENT DOCUMENTS

| | | | |
|---|---|---|---|
| 7,565,358 B2 | 7/2009 | Minogue et al. | |
| 7,587,367 B2 | 9/2009 | Mengerink | |
| 7,668,951 B2 | 2/2010 | Lund et al. | |
| 7,783,741 B2 | 8/2010 | Hardt | |
| 7,870,608 B2 | 1/2011 | Shraim et al. | |
| 7,941,853 B2* | 5/2011 | Rozenberg et al. | 726/22 |
| 8,001,606 B1 | 8/2011 | Spertus | |
| 8,019,689 B1 | 9/2011 | Nachenberg | |
| 8,065,731 B1* | 11/2011 | Nucci et al. | 726/22 |
| 8,200,587 B2 | 6/2012 | Deyo | |
| 8,250,657 B1 | 8/2012 | Nachenberg et al. | |
| 8,312,536 B2 | 11/2012 | Nachenberg et al. | |
| 8,341,745 B1 | 12/2012 | Chau et al. | |
| 8,381,289 B1 | 2/2013 | Pereira et al. | |
| 8,392,997 B2* | 3/2013 | Chen et al. | 726/25 |
| 8,413,251 B1 | 4/2013 | Gibney et al. | |
| 2002/0046041 A1 | 4/2002 | Lang | |
| 2002/0156668 A1 | 10/2002 | Morrow et al. | |
| 2003/0167308 A1 | 9/2003 | Schran | |
| 2004/0054661 A1 | 3/2004 | Cheung et al. | |
| 2004/0138965 A1 | 7/2004 | Laughlin et al. | |
| 2005/0050335 A1 | 3/2005 | Liang et al. | |
| 2005/0268090 A1 | 12/2005 | Saw et al. | |
| 2005/0283837 A1 | 12/2005 | Olivier et al. | |
| 2006/0026123 A1 | 2/2006 | Moore et al. | |
| 2006/0085328 A1 | 4/2006 | Cohen et al. | |
| 2006/0212270 A1 | 9/2006 | Shiu et al. | |
| 2006/0212925 A1 | 9/2006 | Shull et al. | |
| 2006/0212930 A1 | 9/2006 | Shull et al. | |
| 2006/0212931 A1 | 9/2006 | Shull et al. | |
| 2006/0218642 A1 | 9/2006 | Kuppusamy et al. | |
| 2006/0230039 A1 | 10/2006 | Shull et al. | |
| 2006/0253458 A1 | 11/2006 | Dixon et al. | |
| 2006/0253581 A1 | 11/2006 | Dixon et al. | |
| 2006/0253583 A1 | 11/2006 | Dixon et al. | |
| 2006/0253584 A1 | 11/2006 | Dixon et al. | |
| 2007/0011739 A1 | 1/2007 | Zamir et al. | |
| 2007/0016953 A1 | 1/2007 | Morris et al. | |
| 2007/0050444 A1 | 3/2007 | Costea et al. | |
| 2007/0067843 A1 | 3/2007 | Williamson et al. | |
| 2007/0094734 A1 | 4/2007 | Mangione-Smith et al. | |
| 2007/0107053 A1 | 5/2007 | Shraim et al. | |
| 2007/0124579 A1 | 5/2007 | Haller | |
| 2007/0143629 A1 | 6/2007 | Hardjono et al. | |
| 2007/0156886 A1 | 7/2007 | Srivastava | |
| 2007/0162349 A1 | 7/2007 | Silver | |
| 2007/0192855 A1 | 8/2007 | Hulten et al. | |
| 2007/0233782 A1 | 10/2007 | Tali | |
| 2007/0240222 A1* | 10/2007 | Tuvell et al. | 726/24 |
| 2008/0005223 A1 | 1/2008 | Flake et al. | |
| 2008/0028463 A1 | 1/2008 | Dagon et al. | |
| 2008/0077994 A1 | 3/2008 | Comlekoglu | |
| 2008/0082628 A1 | 4/2008 | Rowstron et al. | |
| 2008/0082662 A1 | 4/2008 | Dandliker et al. | |
| 2008/0104180 A1 | 5/2008 | Gabe | |
| 2008/0109244 A1 | 5/2008 | Gupta | |
| 2008/0109473 A1 | 5/2008 | Dixon et al. | |
| 2008/0109491 A1 | 5/2008 | Gupta | |
| 2008/0114709 A1 | 5/2008 | Dixon et al. | |
| 2008/0133540 A1 | 6/2008 | Hubbard et al. | |
| 2008/0133972 A1 | 6/2008 | Verbowski et al. | |
| 2008/0137864 A1 | 6/2008 | Jin et al. | |
| 2008/0140442 A1 | 6/2008 | Warner | |
| 2008/0140820 A1 | 6/2008 | Snyder et al. | |
| 2008/0141366 A1 | 6/2008 | Cross et al. | |
| 2008/0189788 A1 | 8/2008 | Bahl | |
| 2008/0222726 A1* | 9/2008 | Chayes et al. | 726/23 |
| 2008/0255977 A1 | 10/2008 | Altberg et al. | |
| 2008/0263677 A1 | 10/2008 | Kaditz et al. | |
| 2009/0125382 A1 | 5/2009 | Delepet | |
| 2009/0254993 A1 | 10/2009 | Leone | |
| 2009/0282476 A1 | 11/2009 | Nachenberg et al. | |
| 2009/0328209 A1 | 12/2009 | Nachenberg | |
| 2010/0005291 A1 | 1/2010 | Hulten et al. | |
| 2010/0153354 A1 | 6/2010 | Buccella et al. | |
| 2010/0169970 A1* | 7/2010 | Stolfo et al. | 726/22 |
| 2010/0211997 A1* | 8/2010 | McGeehan et al. | 726/4 |
| 2011/0040825 A1 | 2/2011 | Ramzan et al. | |
| 2011/0055923 A1 | 3/2011 | Thomas | |
| 2011/0067101 A1 | 3/2011 | Seshadri et al. | |
| 2011/0225655 A1 | 9/2011 | Niemala et al. | |
| 2012/0197656 A1 | 8/2012 | Lang et al. | |
| 2012/0278264 A1 | 11/2012 | Deyo | |

OTHER PUBLICATIONS

Aringhieri, R. et al., "Fuzzy Techniques for Trust and Reputation Management in Anonymous Peer-to-Peer Systems," Journal of the American Society for Information Science and Technology, 2006, pp. 528-537, vol. 57, No. 4, accessed Jan. 15, 2013 at <http://onlinelibrary.wiley.com/doi11 0.1 002/asi.20307/pdf>.

Colvin, R., Program Manager, SmartScreen, "Stranger Danger"—Introducing SmartScreen® Application Reputation, Oct. 13, 2010, pp. 1-9, can be retrieved at <http://blogs.msdn.com/b/ie/archive/2010/10/13/stranger-danger-introducing-smartscreen-application-reputation.aspx>.

"McAfee SiteAdvisor: What is SiteAdvisor Software?" McAfee®, 2009, [Online] [Retrieved on Jul. 23, 2009] Retrieved from the Internet<URL:http://www.siteadvisor.com/howitworks/index.html>.

"StopBadware.org—StopBadware.org Frequently Asked Questions," stopbadware.org, 2009, [Online] [Retrieved on Jul. 23, 2009] Retrieved from the Internet<URL:htto://www.stopbadware.org/home/faq>.

Trend Micro™, "Outthink the Threat," A Trend Micro eBook, 2008, pp. 1-17, can be retrieved at <http://uk.trendmicro.com/imperia/md/content/campaigns/thinkagain/thinkagain_ebook.pdf>.

"TrustedSource™: the Next-Generation Reputation System White Paper," Secure Computing Corporation, Oct. 2006, 6 pages.

Walsh, L., "Careful, Trend Micro Might Give You a Bad Web Reputation," ChannelWeb Network, Mar. 26, 2007, [online] [Retrieved on Jun. 21, 2007] Retrieved from the Internet<URL:http://www.v3.crn.com/security/198500632>.

Walsh, K., "Fighting PeertoPeer SPAM and Decoys with Object Reputation," ACM, Aug. 22-26, 2005, pp. 1-6.

International Search Report and Written Opinion, PCT Application No. PCT/US09/48328, Dec. 22, 2010, 8 pages.

Brin, S. et al., "The Anatomy of a Large-Scale Hypertextual Web Search Engine," Computer Networks and ISDN Systems, 1998, pp. 107-117, vol. 30, No. 1-7.

Christodorescu, M. et al., "Semantics-Aware Malware Detection," In Proceedings of the 205 IEEE Symposium on Security and Privacy, IEEE Computer Society, 2005.

Gonzalez, J. et al., "Residual Splash for Optimally Parallelizing Belief Propagation," AISTATS, 2009, 8 pages.

Gyongyi, Z. et al., "Combating Web Spam with Trustrank," Proceedings of the Thirtieth International Conference on Very Large Data Bases, VLDB Endowment, 2004, pp. 576-587, vol. 30.

Idika, N. et al., "A Survey of Malware Detection Techniques," Technical Report, Department of Computer Science, Purdue University, 2007, 48 pages.

Kephart, J. et al., "Automatic Extraction of Computer Virus Signatures," 4th Virus Bulletin International Conference, 1994, pp. 178-184.

Kleinberg, J., "Authoritative Sources in a Hyperlinked Environment," Journal of the ACM (JACM), 1999, pp. 604-632, vol. 46, No. 5.

Kolter, J. et al., "Learning to Detect and Classify Malicious Executables in the Wild," The Journal of Machine Learning Research, 2006, p. 2721-2744, vol. 7.

McGlohon, M. et al., "SNARE: A Link Analytic System for Graph Labeling and Risk Detection," Proceedings of the 15th ACM SIGKDD International Conference on Knowledge Discovery and Data mining, ACM, 2009, pp. 1265-1274, New York, N.Y.

Neville, J. et al., "Using Relational Knowledge Discovery to Prevent Securities Fraud," Proceedings of the Eleventh ACM SIGKDD International Conference on Knowledge Discovery in Data Mining, ACM, 2005, p. 458.

(56) References Cited

OTHER PUBLICATIONS

Neville, J. et al., "Collective Classification with Relational Dependency Networks," Workshop on Multi-Relational Data Mining (MRDM-2003), 2003.
Pandit, S. et al., "NetProbe: A Fast and Scalable System for Fraud Detection in Online Auction Networks," WWW '07, Proceedings of the 16th International Conference on World Wide Web, ACM, 2007, pp. 201-210, New York, N.Y.
Pei, J. et al., "On Mining Cross-Graph Quasi-Cliques," Proceedings of the Eleventh ACM SIGKDD International Conference on Knowledge Discovery in Data Mining, ACM, 2005, 11 pages.
Schultz, M. et al., "Data Mining Methods for Detection of New Malicious Executables," IEEE Symposium on Security and Privacy, IEEE Computer Society, 2001, pp. 38-49.
Siddiqui, M. et al., "A Survey of Data Mining Techniques for Malware Detection Using File Features," ACM-SE 46: Proceedings of the 46th Annual Southeast Regional Conference on XX, ACM, 2008, pp. 509-510, New York, N.Y.
Symantec Internet Security Threat Report, 36 pages, [Online] [Retrieved on Aug. 8, 2010] Retrieved from the Internet<URL:http://eval.symantec.com/mktginfo/enterprise/white_papers/b-whitepaper_exec_summary_internet_security_threat_report_xiii_04_2008.en-us.pdf>.
Symantec Malware Definition, [Online] [Retrieved on Aug. 6, 2010] Retrieved from the Internet<URL:http://www.symantec.com/norton/security_response/malware.jsp>.
Symantec Norton Community Watch Privacy Policy, [Online] [Retrieved on Aug. 6, 2010] Retrieved from the Internet<URL:http://www.symantec.com/about/profile/policies/ncwprivacy.jsp>.
Symantec Unveils New Model of Consumer Protection Codenamed "Quorum", 3 pages, [Online] [Retrieved on Aug. 8, 2010] Retrieved from the Internet<URL:https://www.symantec.com/about/news/release/article.jsp?prid=20090706_02>.
Tesauro, G. et al., "Neural Networks for Computer Virus Recognition," IEEE Expert, 1996, pp. 5-6, vol. 11, No. 4.
Tong, H. et al., "Fast Best-Effort Pattern Matching in Large Attributed Graphs," Proceedings of the 13th ACM SIGKDD International Conference on Knowledge Discovery and Data Mining, ACM, 2007, 10 pages.
U.S. Appl. No. 12/059,258, filed Mar. 31, 2008, Inventors Sourabh Satish et al.
U.S. Appl. No. 12/059,271, filed Mar. 31, 2008, Inventors Brian Hernacki et al.
U.S. Appl. No. 12/165,599, filed Jun. 30, 2008, Inventor Carey S. Nachenberg.
U.S. Appl. No. 12/242,634, filed Sep. 30, 2008, Inventors Josephine Gibney et al.
U.S. Appl. No. 12/407,772, filed Mar. 19, 2009, Inventors Carey S. Nachenberg et al.
U.S. Appl. No. 12/416,020, filed Mar. 31, 2009, Inventors Shane Pereira et al.
U.S. Appl. No. 12/831,004, filed Jul. 6, 2010, Inventors Carey S. Nachenberg et al.
U.S. Appl. No. 13/556,401, filed Jul. 24, 2012, Inventors Carey S. Nachenberg et al.
U.S. Appl. No. 13/666,788, filed Nov. 1, 2012, Inventors Carey S. Nachenberg et al.
U.S. Appl. No. 13/558,177, filed Jul. 25, 2012, Inventors Scott Schneider et al.
Wang, W. et al., "GraphMiner: A Structural Pattern-Mining System for Large Disk-Based Graph Databases and Its Applications," Proceedings of the 2005 ACM SIGMOD International Conference on Management of Data, ACM, 2005, pp. 879-881.
Weaver, N. et al., "A Taxonomy of Computer Worms," Proceedings of the 2003 ACM Workshop on Rapid Malcode, ACM, 2003, pp. 11-18, New York, N.Y.
Xie, Y. et al., "Innocent by Association: Early Recognition of Legitimate Users," Oct. 16-18, 2012, CCS '12: Proceedings of the 2012 ACM Conference on Computer and Communications Security,; pp. 353-364.
Yan, X. et al., "gSpan: Graph-Based Substructure Pattern Mining," Proceedings of the 2002 IEEE International Conference on Data Mining (ICDM '02), 2002, 4 pages.
Yan, X. et al., "Mining Closed Relational Graphs with Connectivity Constraints," Proceedings of the Eleventh ACM SIGKDD International Conference on Knowledge Discovery in Data Mining, ACM, 2005, p. 333.
Yedidia, J. et al., "Understanding Belief Propagation and Its Generalizations," Exploring Artificial Intelligence in the New Millennium, 2003, pp. 236-239, vol. 8.
Zeng, Z. et al., "Coherent Closed Quasi-Clique Discovery from Large Dense Graph Databases," Proceedings of the 12th ACM SIGKDD International Conference on Knowledge Discovery and Data Mining, ACM, 2006, 6 pages.
Zhu, X., "Semi-Supervised Learning with Graphs," 2005, 174 pages.
White, R., "How Computers Work," Que, Oct. 2003, 44 pages.

\* cited by examiner

INFERRING FILE AND WEBSITE REPUTATIONS BY BELIEF PROPAGATION LEVERAGING MACHINE REPUTATION

BACKGROUND

1. Field of Disclosure

The disclosure generally relates to the field of computer security, in particular to detecting malicious software and/or websites.

2. Description of the Related Art

A wide variety of malicious software (malware) can attack modern computers. Malware threats include computer viruses, worms, Trojan horse programs, spyware, adware, crimeware, and phishing websites. Malicious entities sometimes attack servers that store sensitive or confidential data that can be used to the malicious entity's own advantage. Similarly, other computers, including home computers, must be constantly protected from malicious software that can be transmitted when a user communicates with others via electronic mail, when a user downloads new programs or program updates, and in many other situations. The different options and methods available to malicious entities for attack on a computer are numerous.

Conventional techniques for detecting malware, such as signature string scanning, are becoming less effective. Modern malware is often targeted and delivered to only a relative handful of computers. For example, a Trojan horse program can be designed to target computers in a particular department of a particular enterprise. Such malware might never be encountered by security analysts, and thus the security software might never be configured with signatures for detecting such malware. Mass-distributed malware, in turn, can contain polymorphisms that make every instance of the malware unique. As a result, it is difficult to develop signature strings that reliably detect all instances of the malware. Accordingly, there is a need for new techniques that can detect malware.

SUMMARY

Embodiments of the present disclosure include methods (and corresponding systems and non-transitory computer-readable storage media) for detecting malware by inferring the reputation of a computer file and/or website through iteratively propagating domain knowledge among related clients, computer files, websites, and/or source domains.

One aspect of the present disclosure is a computer-implemented method for detecting malicious computer files, comprising: generating a graph comprising nodes representing a plurality of clients and computer files residing thereon, wherein distinct clients and distinct computer files are represented by distinct nodes in the graph, wherein a node representing a client is connected to nodes representing computer files residing on that client through edges; determining priors for nodes in the graph and edge potentials for edges in the graph based on domain knowledge, wherein a prior for a node representing a client comprises an assessment of a likelihood of the client getting infected by malware based on the domain knowledge, a prior for a node representing a computer file comprises an assessment of a likelihood of the computer file being malware based on the domain knowledge, and an edge potential reflects a relationship between nodes connected by an associated edge based on the domain knowledge; iteratively propagating a probability of a computer file being legitimate among the nodes by transmitting messages along the edges in the graph, wherein a message transmitted by a node is generated based on a prior of the node and messages received by the node during any previous iterations; and determining whether a computer file is classified as malicious based on a probability associated with a corresponding node in the graph.

Another aspect of the present disclosure is a computer system for detecting malicious computer files, comprising: a non-transitory computer-readable storage medium storing executable computer program code, the computer program code comprising program code for: generating a graph comprising nodes representing a plurality of clients and computer files residing thereon, wherein distinct clients and distinct computer files are represented by distinct nodes in the graph, wherein a node representing a client is connected to nodes representing computer files residing on that client through edges; determining priors for nodes in the graph and edge potentials for edges in the graph based on domain knowledge, wherein a prior for a node representing a client comprises an assessment of a likelihood of the client getting infected by malware based on the domain knowledge, a prior for a node representing a computer file comprises an assessment of a likelihood of the computer file being malware based on the domain knowledge, and an edge potential reflects a relationship between nodes connected by an associated edge based on the domain knowledge; iteratively propagating a probability of a computer file being legitimate among the nodes by transmitting messages along the edges in the graph, wherein a message transmitted by a node is generated based on a prior of the node and messages received by the node during any previous iterations; and determining whether a computer file is classified as malicious based on a probability associated with a corresponding node in the graph.

Still another aspect of the present disclosure is a non-transitory computer-readable storage medium encoded with executable computer program code for detecting malicious computer files, the computer program code comprising program code for: generating a graph comprising nodes representing a plurality of clients and computer files residing thereon, wherein distinct clients and distinct computer files are represented by distinct nodes in the graph, wherein a node representing a client is connected to nodes representing computer files residing on that client through edges; determining priors for nodes in the graph and edge potentials for edges in the graph based on domain knowledge, wherein a prior for a node representing a client comprises an assessment of a likelihood of the client getting infected by malware based on the domain knowledge, a prior for a node representing a computer file comprises an assessment of a likelihood of the computer file being malware based on the domain knowledge, and an edge potential reflects a relationship between nodes connected by an associated edge based on the domain knowledge; iteratively propagating a probability of a computer file being legitimate among the nodes by transmitting messages along the edges in the graph, wherein a message transmitted by a node is generated based on a prior of the node and messages received by the node during any previous iterations; and determining whether a computer file is classified as malicious based on a probability associated with a corresponding node in the graph.

According to yet another aspect of the present disclosure, the above-described graphs also comprise nodes representing a plurality of source domains hosting the computer files, wherein distinct source domains are represented by distinct nodes in the graph, wherein a node representing a source domain is connected to nodes representing computer files hosted by that source domain through edges, wherein a prior for a node representing a source domain comprises an assessment of a likelihood for the source domain hosting malware based on the domain knowledge.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

FIG. (FIG.) 1 is a high-level block diagram of a computing environment according to one embodiment of the present disclosure.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

System Environment

Figure 1:
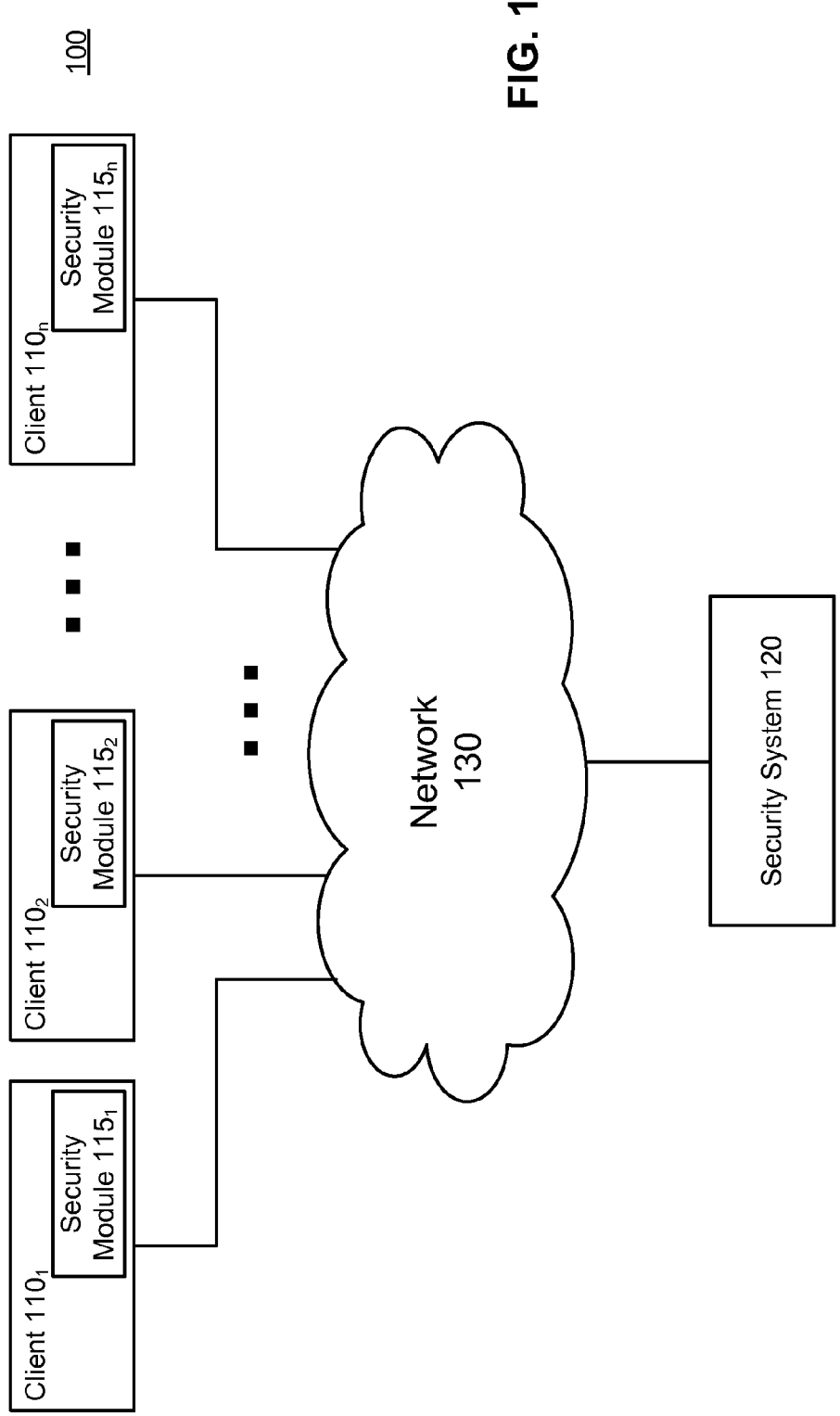

FIG. 1 is a high-level block diagram that illustrates a computing environment 100 for detecting malware in clients (or client systems), according to one embodiment of the present disclosure. As shown, the computing environment 100 includes multiple clients $110_1$ through $110_n$ and a security system 120 connected through a network 130. There can be other entities in the computing environment 100 as well.

A client 110 is an electronic device that can host malicious software. One example of a client 110 is a conventional computer system executing, for example, a Microsoft Windows-compatible operating system (OS), Apple OS X, and/or a Linux distribution. Another example of a client 110 is a device having computer functionality, such as a personal digital assistant (PDA), mobile telephone, video game system, etc. A client 110 typically stores numerous computer files that can host malicious software.

Malicious software, sometimes called "malware," is generally defined as software that executes on the client 110 surreptitiously or that has some surreptitious functionality. Malware can take many forms, such as parasitic viruses that attach to legitimate files, worms that exploit weaknesses in the computer's security in order to infect the computer and spread to other computers, Trojan horse programs that appear legitimate but actually contain hidden malicious code, and spyware that monitors keystrokes and/or other actions on the computer in order to capture sensitive information or display advertisements.

Each client 110 executes a security module 115 for detecting malware residing on the client 110. The security module 115 can be, for example, incorporated into the OS of the client 110 or part of a separate comprehensive security package. In one embodiment, the security module 115 is provided by the entity that operates the security system 120. The security module 115 can communicate with the security system 120 via the network 130 for information related to malware detection.

The security module 115 collects information about computer files stored on the client 110 and transmits the information to the security system 120 via the network 130. Examples of such information include file names, fingerprints, and file metadata such as source domain (or host domain) identifiers and digital signatures. A source domain identifier is an identifier (e.g., an IP address, an identification label) that defines a subset of the Internet based on a protocol such as the Domain Name System (DNS). A source domain identifier specifies a domain (e.g., www.domain.com) or a subdomain (e.g., www.domain.com/trustworthy/, www.domain.com/untrustworthy/) from which the underlying computer file originates (e.g., was downloaded from). Because many domains host different computer files at different subdomains (e.g., hosting user-posted files on one subdomain, and hosting official releases on a separate subdomain), the subdomain identifiers can be used to provide additional details about the source of the associated computer files.

Figure 7:
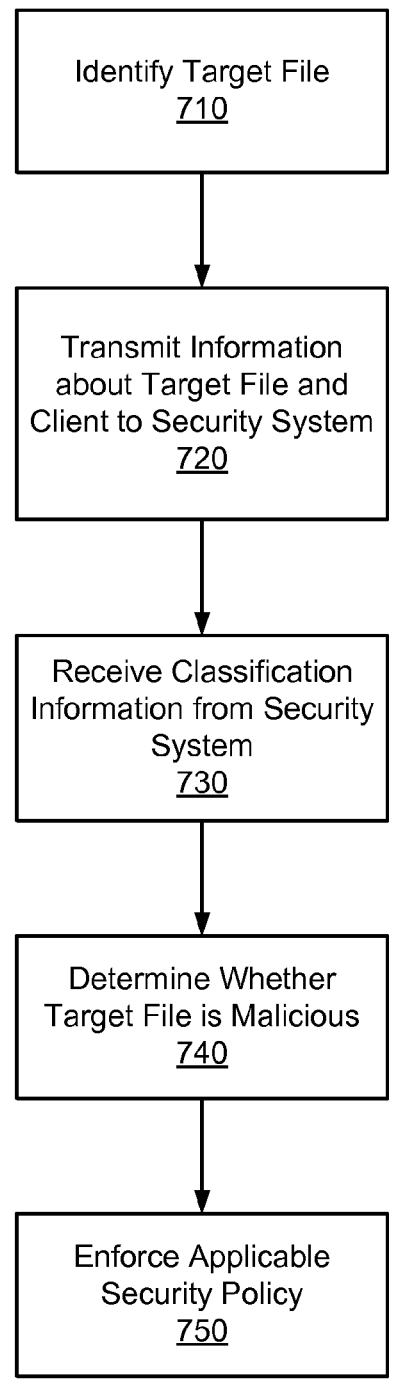

The security module 115 also receives classification information for the computer files from the security system 120. Examples of the classification information include a classification (e.g., whether a file is malware or legitimate) and an accompanying probability that measures a likelihood of the classification being accurate. For example, the probability (also called a marginal probability) can be a continuous value ranging from 0 to 1, with a score of 0 indicating a very low likelihood (e.g., very unlikely that the classification is accurate) and a score of 1 indicating a very high likelihood (e.g., very likely that the classification is accurate). The security module 115 determines whether a computer file is malware based on the classification and the probability for the computer file received from the security system 120. The process for the security module 115 to detect malware is illustrated in FIG. 7 and described in detail below.

The security system 120 is a hardware device and/or software program configured to receive information about computer files (e.g., their fingerprints and metadata) from the clients 110 and other sources, infer the reputation of the computer files by iteratively propagating and aggregating domain knowledge among related files and clients 110, and determine classifications of the files based on their reputation. An example of the security system 120 is a web-based system providing security software and services allowing the security module 115 to detect malware in the clients 110.

The reputation of a computer file is a measurement of the likelihood of the file for being legitimate (versus being malware), and is also called the "goodness" of the file, or the probability of the file for being legitimate. For example, the reputation can be a continuous value ranging from 0 to 1, which a score of 0 or very close to 0 indicating a very low probability (e.g., very unlikely that the file is legitimate) and a score of 1 or very close to 1 indicating a very high probability (e.g., very likely that the file is legitimate).

Figure 5:
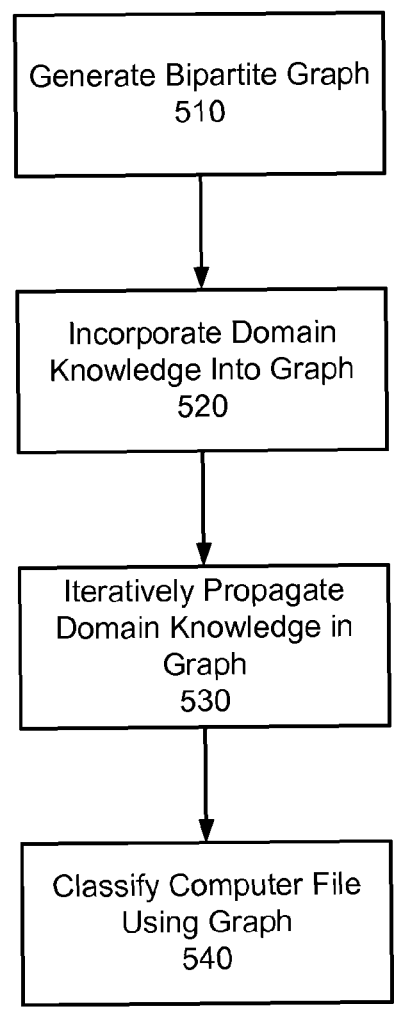
FIGS. 5-7 are flow diagrams collectively illustrating a process for detecting malware by inferring the reputation of a computer file through iteratively propagating domain knowledge among related clients and computer files residing thereon according to one embodiment of the present disclosure.
Figure 6:
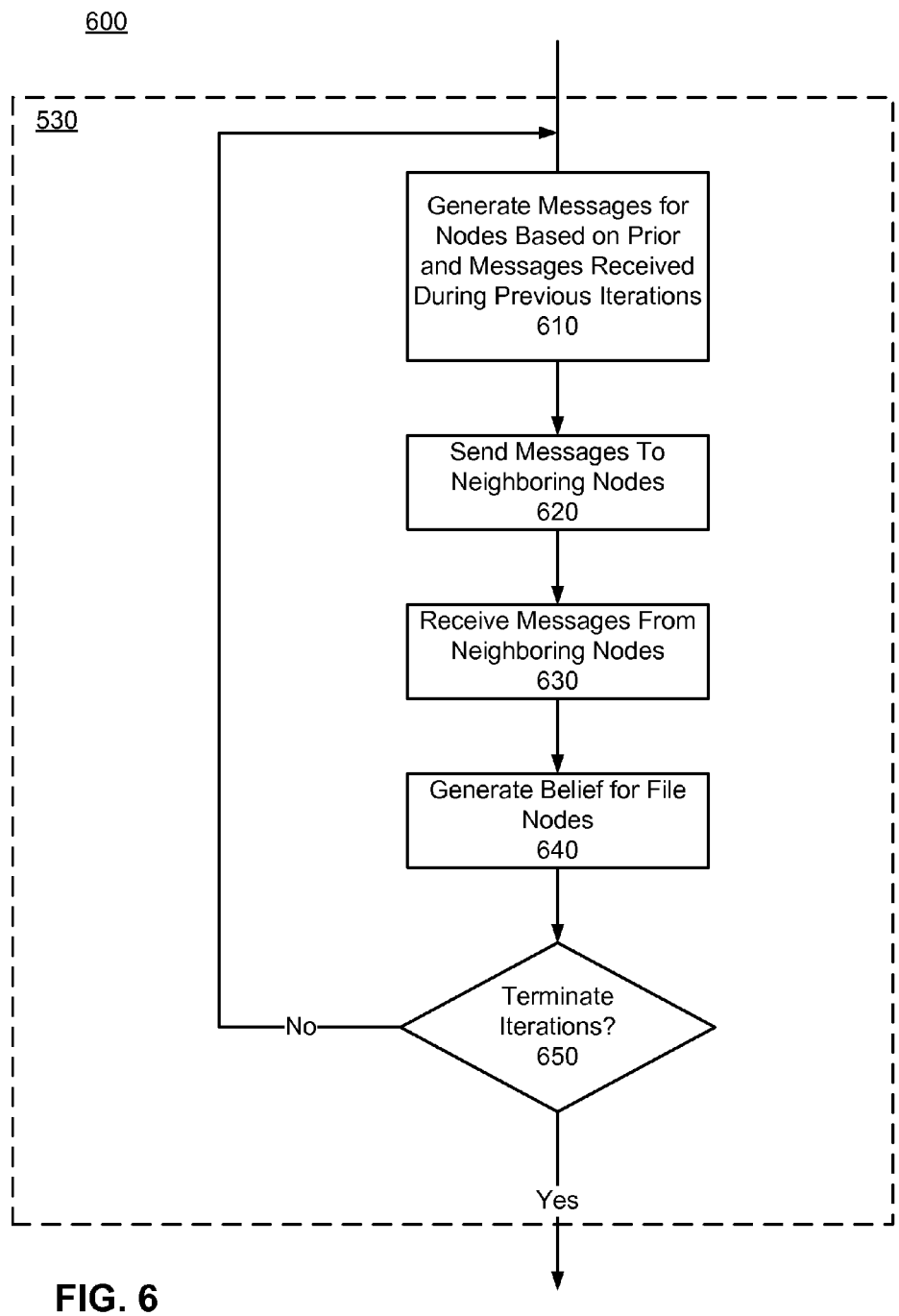

The security system 120 determines the reputation of the computer files by generating a graph of the clients 110 and the computer files (also called files), and inferring the reputation iteratively. The security system 120 incorporates domain knowledge into the graph, and iteratively propagates and accumulates the domain knowledge among connected nodes to infer the reputation of the files. This iterative process continues until a predetermined stopping criterion is met. The process for the security system 120 to determine reputation and to use the reputation to classify a computer file is illustrated in FIGS. 5 and 6 and described in detail below.

In one embodiment, in addition to files and clients 110, the graph also includes nodes representing source domains of the files (e.g., the domains where the files were downloaded from) and domain knowledge about the source domains. The domain knowledge about the source domains, like the domain knowledge about the files and the clients 110, are iteratively propagated among connected nodes in the graph to infer the reputation of the files and/or the source domains. In other embodiments, the graph can include additional or alternative types of nodes to represent entities such as software publishers, signers of digital signatures, and additional attributes such as file names.

Depending on the embodiment, one or more of the functions of the security system 120 can be provided by a cloud computing environment. As used herein, cloud computing refers to a style of computing in which dynamically scalable and often virtualized resources are provided as a service over the network 130. Functions of the inspected clients 110 can also be provided by the cloud computing environment.

The security system 120 beneficially detects malware more accurately (e.g., with a high true positive rate) and with fewer false malware detections (e.g., with a low false positive rate) than other malware detection systems. In addition, the security system 120 is scalable and is capable of leveraging large amounts of data.

The network 130 enables communications between the client 110 and the security system 120. In one embodiment, the network 130 uses standard communications technologies and/or protocols. Thus, the network 130 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 130 can be represented using technologies and/or formats including the hypertext markup language (HTML), the extensible markup language (XML), JavaScript, VBScript, Flash, PDF, PostScript, etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 130 can also include links to other networks such as the Internet.

Computer Architecture

Figure 2:
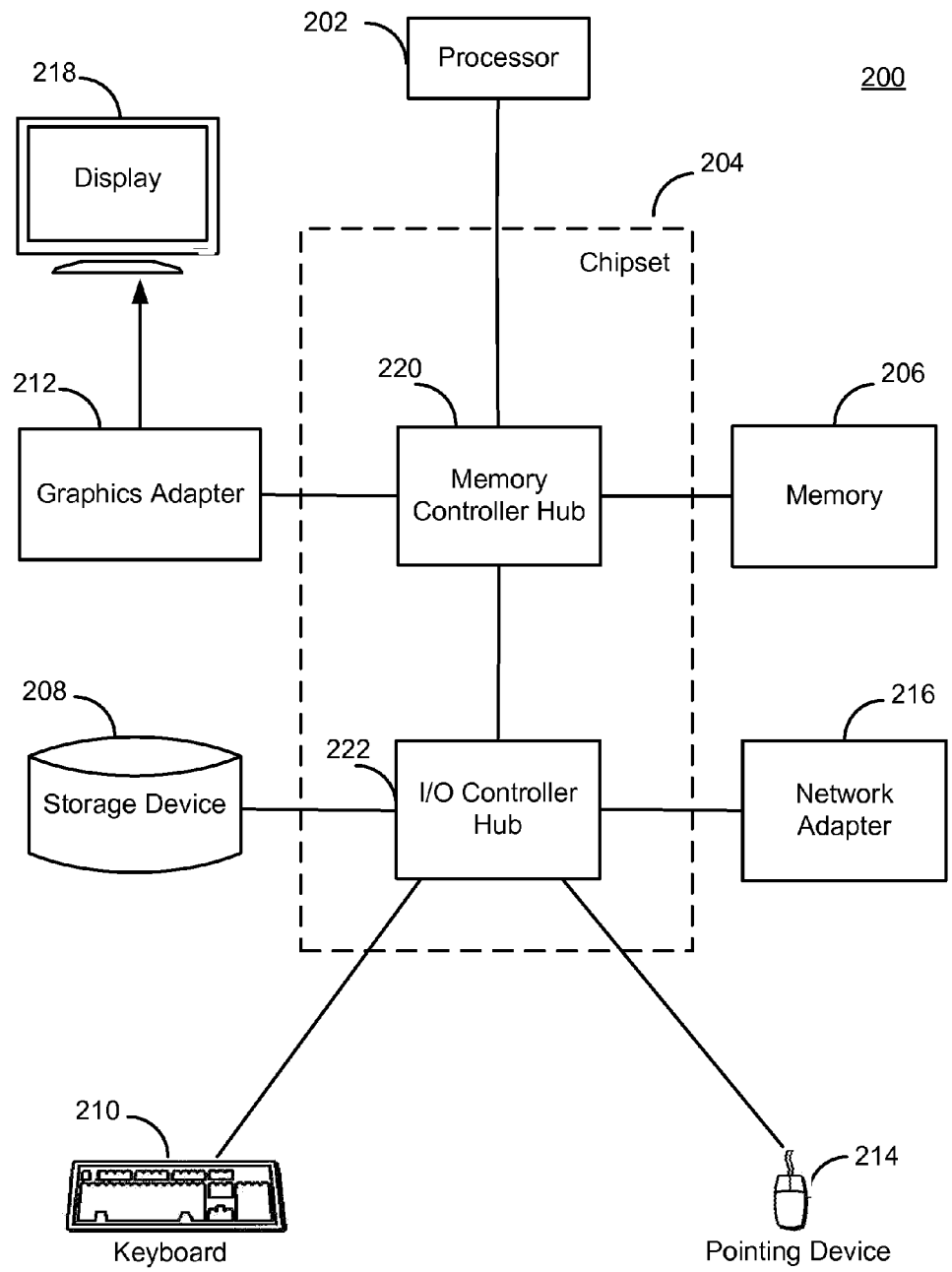
FIG. 2 is a high-level block diagram illustrating an example of a computer for use in the computing environment shown in FIG. 1 according to one embodiment of the present disclosure.

The entities shown in FIG. 1 are implemented using one or more computers. FIG. 2 is a high-level block diagram illustrating an example computer 200. The computer 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, keyboard 210, pointing device 214, and network adapter 216 are coupled to the I/O controller hub 222. Other embodiments of the computer 200 have different architectures.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display 218. The network adapter 216 couples the computer system 200 to one or more computer networks.

The computer 200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 208, loaded into the memory 206, and executed by the processor 202.

The types of computers 200 used by the entities of FIG. 1 can vary depending upon the embodiment and the processing power required by the entity. For example, the security system 120 might comprise multiple blade servers working together to provide the functionality described herein. As another example, the client 110 might comprise a mobile telephone with limited processing power. The computers 200 can lack some of the components described above, such as keyboards 210, graphics adapters 212, and displays 218.

Example Architectural Overview of the Security Module

Figure 3:
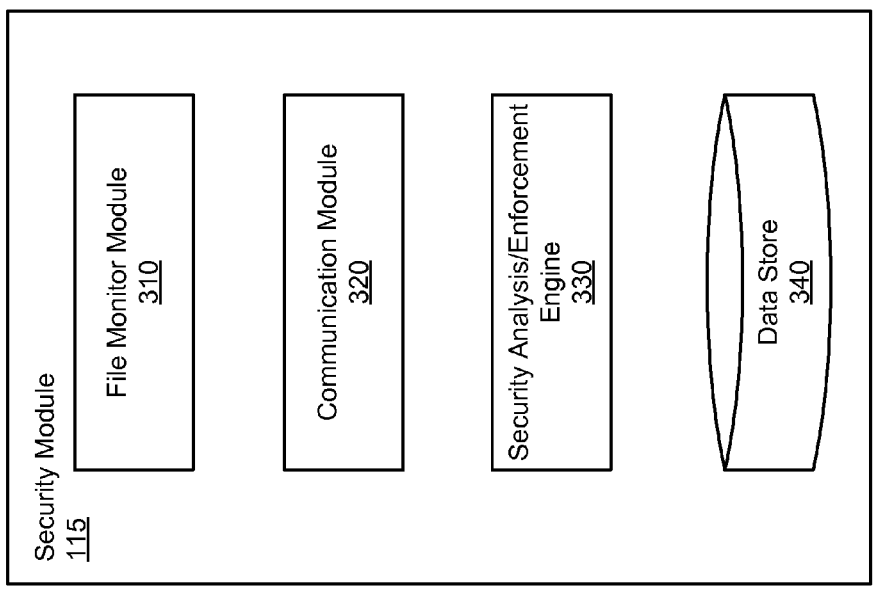
FIG. 3 is a high-level block diagram illustrating modules within a security module according to one embodiment of the present disclosure.

FIG. 3 is a high-level block diagram illustrating a detailed view of modules within the security module 115 according to one embodiment. Some embodiments of the security module 115 have different and/or other modules than the ones described herein. Similarly, the functions can be distributed among the modules in accordance with other embodiments in a different manner than is described here. As illustrated, the security module 115 includes a file monitor module 310, a communication module 320, a security analysis/enforcement engine 330, and a data store 340.

The file monitor module 310 identifies computer files residing on the client 110 and collects information about the computer files. Examples of the collected information include, for example, the file's name, source domain identifier (e.g., the website or IP address from which the file was downloaded), storage location, metadata (e.g., digital signature), fingerprint, and activity (e.g., system activities such as reads and/or writes on protected areas of the file system). The file monitor module 310 stores the collected information in the data store 340.

The communication module 320 communicates with the security system 120 to provide information about the monitored computer files and/or information about the client 110 (e.g., a unique identifier of the client), and to receive information about the computer files (e.g., the classification and associated probability that the classification is accurate). The communication module 320 stores the received information in the data store 340 together with other related information for the computer files.

The security analysis/enforcement engine 330 determines whether the monitored files are malicious based on the classification information received from the security system 120 and enforces an applicable security policy based on the determination. For example, the engine 330 can determine that a file is malware if the received corresponding classification indicates that the file is malware. Additionally or alternatively, the engine 330 can make the determination based on other malware detection mechanisms and/or a local security policy that takes into consideration other factors such as the probability of the classification, and observed behavior of the computer file. For example, if the client 110 has a relaxed security policy in place then the engine 330 can determine that a file is malware only if the file is classified as malware and accompanied by a high probability that the classification is accurate. On the other hand, if the client 110 has a strict security policy in place then the engine 330 can determine that a file is malware unless the file is classified legitimate and accompanied by a high probability.

The security analysis/enforcement engine 330 also enforces an applicable security policy based on the determination of whether a computer file is malware. For example, if a computer file is determined as malware, the engine 330 may prohibit the computer file from running, quarantine/clean/delete the computer file, and/or generate a warning message, depending on the policy. On the other hand, if the computer file is determined legitimate, the engine 330 may permit the computer file to run on the client 110, and/or instruct the communication module 320 to stop monitoring the computer file or only monitor loosely.

The data store 340 stores data used by the security module 115. Examples of such data include information collected for the computer files residing on the client 110 (e.g., file fingerprints, source domain identifiers, metadata), received classification information (e.g., classification, probability), and information about the security system 120 (e.g., IP address). The data store 340 may be a relational database or any other type of database.

Example Architectural Overview of the Security System

Figure 4:
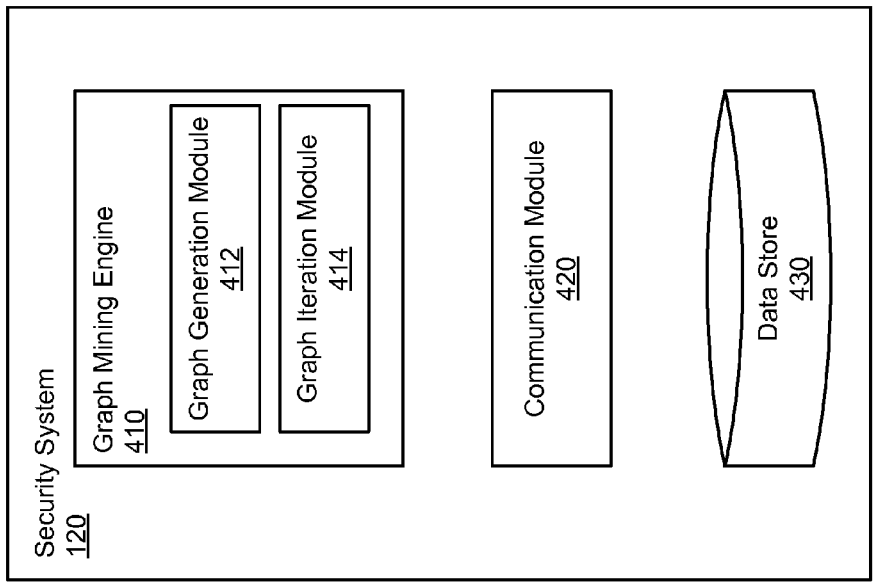
FIG. 4 is a high-level block diagram illustrating modules within a security system according to one embodiment of the present disclosure.

FIG. 4 is a high-level block diagram illustrating a detailed view of modules within the security system 120 according to one embodiment. Some embodiments of the security system 120 have different and/or other modules than the ones described herein. Similarly, the functions can be distributed among the modules in accordance with other embodiments in a different manner than is described here. As illustrated, the security system 120 includes a graph mining engine 410, a communication module 420, and a data store 430.

The graph mining engine 410 generates a graph of nodes representing clients 110 and computer files residing on the clients 110, iteratively infers the reputation (i.e., goodness) of the computer files based on prior knowledge about the files and the related clients 110, and classifies the computer files (e.g., as malware or legitimate) based on their reputation. In one embodiment, the graph is a bipartite graph that includes two types of nodes: nodes representing clients 110 (called machine nodes), and nodes representing computer files (called file nodes). In the bipartite graph, each machine node is connected through edges to file nodes representing computer files residing on the client 110 represented by that machine node. The bipartite graph G can be represented by the following equation:

$$G=(V,E), \quad (1)$$

where V represents the machine nodes and the file nodes in the graph, and E represents the edges in the graph.

In another embodiment, the graph is a tri-partite graph that includes three types of nodes: machine nodes, file nodes, and nodes representing source domains (called domain nodes). In addition to the connections between the machine nodes and the file nodes as described above with respect to the bipartite graph, each domain node is connected through edges to file nodes representing computer files downloaded from (or hosted by) the source domain represented by that domain node.

Each machine node is associated with a score, called a "machine prior", that reflects prior knowledge about the corresponding client 110. Similarly, each file node is associated with a score, called a "file prior", that reflects prior knowledge about the corresponding computer file. Each domain node in the tri-partite graph is associated with a score, called a "domain prior", that reflects prior knowledge about the corresponding source domain.

In one embodiment, each node $v_i$ is associated with a binary class label $x_i \in \{x_g, x_b\}$, where $x_g$ is the "good" label (or class) and $x_b$ is the "bad" label, and a marginal probability that the represented client 110, computer file, or source domain is good, $P(x_i = x_g)$. A file node is considered "good" if the represented file is legitimate, and considered "bad" if the represented file is malicious. A machine node is considered "good" if the represented client 110 is unlikely to get infected by malware, and considered "bad" if the represented client 110 is likely to get infected by malware. A domain node is considered "good" if the represented source domain is unlikely to host malware, and considered "bad" if the represented source domain is likely to host malware. The marginal probability is also called a "belief". As will be described in detail below with respect to Equation 4, the value of a belief is initially heavily based on the associated "prior", and subsequently adjusted based on domain knowledge propagated from neighboring nodes. In other embodiments, there may be more than two classes of labels.

Each edge connecting a machine node and a file node is associated with an edge potential that reflects a homophilic machine-file relationship between the machine node and the file node connected by the edge. Similarly, each edge connecting a domain node and a file node is associated with an edge potential that reflects a homophilic domain-file relationship between the domain node and the file node connected by the edge. It is observed that legitimate computer files (i.e., files that are classified good) are more likely to appear on source domains and clients 110 with good reputations (i.e., source domains and clients 110 that are classified good) and malicious computer files (i.e., files that are classified bad) are more likely to appear on source domains and clients 110 with low reputation (i.e., source domains and clients 110 that are classified bad). This observed relationship is called the homophilic machine-file relationship and the homophilic domain-file relationship (collectively called the homophilic relationship). The edge potential is set to capture the homophilic relationship between the domain/machine node and the file node connected by the associated edge. For example, the edge potential for an edge, represented as $\psi_{ij}(x_i, x_j)$, can be defined using the following formula:

| $\psi_{ij}(x_i, x_j)$ | $x_j = x_g$ | $x_j = x_b$ |
|---|---|---|
| $x_i = x_g$ | $0.5 + \varepsilon$ | $0.5 - \varepsilon$ |
| $x_i = x_b$ | $0.5 - \varepsilon$ | $0.5 + \varepsilon$ | where $x_i$ and $x_1$ are the labels associated with the file/machine/domain nodes connected to the associated edge. The symbol $\epsilon$ represents a value that reflects the homophilic relationship between the connected machine node and file node. The value of $\epsilon$ is typically small (e.g., 0.001). Formally, $\omega_{ij}(x_i, x_j)$ equals the probability of a node $v_i$ being in class $x_i$ given that its neighbor $v_j$ is in class $x_j$. Other edge potentials represent relationships in addition to (or instead of) the homophilic relationships, and the represented relationships may span over multiple nodes and not limited to the pair of nodes that are immediately connected.

As shown, the graph mining engine 410 includes a graph generation module 412 and a graph iteration module 414. The graph generation module 412 generates a (bipartite or tri-partite) graph describing the clients 110 that communicate with the security system 120 via the network 130. In the case of a bipartite graph, the graph generation module 412 generates a machine node for each distinct client 110, a file node for each distinct file, and edges between the machine nodes and the file nodes based on their associations. If computer files reported by multiple clients 110 appear to be instances of a same computer file (e.g., two files have an identical fingerprint), the graph generation module 412 treats such computer files as a single file, generates a single file node to represent it, and connects the file node with the machine nodes representing the multiple clients 110 that reported having the file. In the case of a tri-partite graph, in addition to the machine nodes, the file nodes, and the edges connecting the related machine nodes and file nodes, the graph generation module 412 generates a domain node for each distinct source domain, and connects the domain node with file nodes representing files hosted by (or downloaded from) that source domain. In one embodiment, the graph includes nodes that represent multiple computer files, clients 110, or source domains. This type of nodes are called group nodes and serve to represent collective (or higher-level summary) views of the represented groups.

The graph generation module 412 sets the priors and the edge potentials based on domain knowledge. Examples of the domain knowledge includes observations such as the homophilic relationship, the file goodness intuition (i.e., legitimate files typically appear on many clients 110 and malicious files typically appear on few clients 110), and file ground truth set (e.g., files known to be legitimate or malicious). The graph generation module 412 can also leverage other characteristics of the computer files, the clients 110, and the source domains in the domain knowledge to determine the priors for the nodes and the edge potentials for the edges.

The graph generation module 412 determines the prior of a node $v_i$ by applying a node potential function $\phi(x_i)$ that takes into account domain knowledge related to $v_i$. Thus, the prior associated with the node $v_i$ reflects (or quantifies) the domain knowledge relevant to $v_i$. For files in the file ground truth set, the node potential function determines the priors (called known-file priors) based on their known classification (e.g., legitimate or malicious). The node potential function sets the priors of the file nodes representing computer files that are known to be good (i.e., legitimate/non-malicious) to be high (e.g., 0.99), and sets the priors of the file nodes representing computer files that are known to be bad (i.e., malicious) to be low (e.g., 0.01).

For files not in the file ground truth set, the node potential function sets their priors (called unknown-file priors) based on related domain knowledge such as file goodness intuition—legitimate files typically appear on many clients 110 and malware appears on few clients 110. To this end, the node potential function sets the priors of the file nodes representing computer files that appear on large numbers of clients 110 to be high (e.g., 0.99), and sets the priors of the file nodes representing computer files that appear on small numbers of clients 110 to be low or neutral (e.g., 0.5).

For machine nodes, the node potential function sets their priors (called machine priors) based on domain knowledge related to the corresponding clients 110. In one embodiment, the node potential function determines the machine priors using the following equation:

$$\text{machine prior} = e^{-k \times reputation}, \quad (2)$$

where k is a constant value, and reputation is an assessment of the trustworthiness of the corresponding client 110 that is determined based on domain knowledge and factors such as the number of virus infections reported by the client 110, and other aspects of the usage and behavior of the client 110. In one example, the reputation is defined as the number of infections detected by the underlying client 110 divided by the total number of file submissions made by the client 110, and the value of k is 1,000.

For domain nodes, the node potential function sets their priors (called domain priors) based on domain knowledge related to the corresponding source domains. In one embodiment, the node potential function determines the domain prior of a domain node based on the number of files hosted on the represented source domain that are in the file ground truth set and their corresponding classifications (e.g., the portion of known files that are classified legitimate). The graph generation module 412 sets the edge potentials for the edges in the graph based on the priors of the nodes connected by the associated edges.

The graph iteration module 414 determines (or infers) the reputation of computer files represented in the graph by propagating and aggregating domain knowledge among connected nodes through successive iterations. The reputation of a file represented by a file node $v_i$ is measured by the associated belief, the marginal probability that the file is legitimate, $P(x_i = x_g)$. Similarly, in a tri-partite graph, in addition to (or instead of) the reputation of computer files, the graph iteration module 414 determines the reputation of source domains by iteratively propagating and aggregating domain knowledge. In one embodiment, the graph iteration module 414 applies a belief propagation algorithm, $O(|E|)$, to propagate the domain knowledge about a node to neighboring nodes and aggregate the domain knowledge about the neighboring nodes to the node through iterative message passing between all pairs of nodes within the graph.

More specifically, let $m_{ij}(x_j)$ denotes the message sent from node $v_i$ to node $v_j$. Intuitively, this message represents $v_i$'s opinion about $v_j$'s likelihood of being in class $x_j$. The message $m_{ij}(x_j)$ is mathematically determined using the following formula:

$$m_{ij}(x_j) \leftarrow \sum_{x_i \in X} \phi(x_i) \psi_{ij}(x_i, x_j) \prod_{k \in N(i) \setminus j} m_{ki}(x_i), \quad (3)$$

where $N(i)$ is the set of nodes neighboring node $v_i$, $\phi(x_i)$ is the prior assigned to node $v_i$ reflecting domain knowledge about $v_i$, and $\psi_{ij}(x_i, x_j)$ is the edge potential associated with the edge connecting nodes $v_i$ and $v_j$ that serves to transform the incoming messages received in previous iterations into the node's outgoing messages for the present iteration. Thus, each outgoing message from a node $v_i$ to a neighboring node $v_j$ is generated based on the incoming messages from $v_i$'s other neighbors during previous iterations.

In one embodiment, after each iteration, the graph iteration module 414 updates the belief of the nodes in the graph based on the messages received by the nodes using the following equation:

$$b_i(x_i) = k\phi(x_i) \prod_{x_j \in N(i)} m_{ji}(x_i), \quad (4)$$

where $m_{ji}(x_i)$ are messages received by the node $v_i$, $\phi(x_i)$ is the prior of $v_i$ and k is a constant value that normalizes the result (e.g., to be between 0 and 1). The updated belief $b_i(x_i)$ represents a more accurate estimation of the marginal probability that $v_i$ is in class $x_i$. The graph iteration module 414 updates the associated labels based on the updated belief In one embodiment, the beliefs are only calculated once the iteration process terminates.

The graph iteration module 414 terminates the iteration process when a predetermined stopping criterion is met. In one embodiment, the graph iteration module 414 terminates the process when the beliefs converge within a predetermined threshold value (e.g., $10^{-5}$) or a maximum number of iterations has finished. For example, if after a given iteration, the average (or maximum) value changed among all the beliefs is smaller than the threshold value (e.g., $10^{-5}$), the graph iteration module 414 determines that the beliefs are converged and as a result terminates the iteration process. In another embodiment, the graph iteration module 414 terminates the process when a goal-based stopping criterion is met. The goal of the stopping criterion can be measured by a subset of the files in the file ground truth set. For example, a subset (e.g., 10%) of the files in the file ground truth set can be treated as unknown files, and their resulting classifications can be compared to their labels in the file ground truth set to measure the performance of the system. According to one example goal-based stopping criterion, the graph iteration module 414 terminates the process when a local maxima for a true positive rate has been reached. For example, given a predetermined false positive rate constant value, the graph iteration module 414 examines the resulting true positive rate after each iteration, and terminates the iteration process when the value of the true positive rate starts reducing (i.e., passed a local maxima). The true positive rate and the false positive rate can be measured using the subset of the file ground truth set. For example, the true positive rate is the rate of known malware being correctly classified as malware, and the false positive rate is the rate of known legitimate files being incorrectly classified as malware. The graph iteration module 414 may restore the status of the graph to the previous iteration (i.e., when the local maxima was reached) as the iteration outcome.

The final beliefs of the file nodes in the graph are deemed as the marginal probabilities of the corresponding files being good. The graph iteration module 414 labels the file nodes as "good" or "bad" based on the final beliefs (i.e., the marginal probabilities). For example, if the marginal probability (of a file being good) exceeds a predetermined threshold value (e.g., 0.5), then the graph iteration module 414 labels the file good (or legitimate) and otherwise bad (or malware). The graph mining engine 410 can then classify the computer file (e.g., whether a file is malware or legitimate) based on its corresponding label. In addition, in a tri-partite graph the graph iteration module 414 can treat the final beliefs of the domain nodes in the graph as the marginal probabilities of the corresponding source domains being good, label the domain nodes based on their final beliefs, and classify the corresponding source domains accordingly.

The graph mining engine 410 can be readily adapted to classify other entities, such as websites (e.g., legitimate websites versus malicious websites). For example, instead of generating a graph of nodes representing clients 110 and files residing thereon, the graph mining engine 410 can generate a bipartite graph of nodes representing clients 110 and websites the clients 110 visited, derive the reputation of each website by iteratively propagating and aggregating related domain knowledge among the connected machine nodes and website nodes, and classify the websites based on their reputations.

The communication module 420 receives file information from the security modules 115 running on the clients 110 and provides corresponding classification information to the security modules 115. Examples of the classification information include the label associated with the file node representing the underlying computer file and the accompanying marginal probability (i.e., the final belief). The classification information can be used in the security module 115 for malware detection.

The data store 430 stores data used by the security system 120. Examples of such data include the file ground truth set, the graph, information received from the security modules 115, and information about the clients 110, to name a few. Similar to the client data store 340, the data store 430 may be a relational database or any other type of database.

Overview of Methodology for the Security System

FIG. 5 is a flow diagram illustrating a process 500 for the security system 120 to automatically detect malware among computer files by inferring the reputation of the files from domain knowledge related to the files, related clients 110, and/or related source domains by iteratively propagating and aggregating the domain knowledge among the related files, clients 110, and/or source domains, according to one embodiment. Other embodiments can include different and/or additional steps than the ones described herein.

The security system 120 generates 510 a graph of nodes representing clients 110 and computer files residing thereon, and connects the machine nodes with the file nodes through edges based on their associations. The security system 120 incorporates 520 domain knowledge into the graph by setting the machine-priors of the machine nodes, the known-file/unknown-file priors of the file nodes, and the edge potentials of the edges based on the relevant domain knowledge. In one embodiment, in addition to the clients 110 and the computer files, the security system 120 represents source domains of the computer files in the graph, connects the domain nodes with the file nodes through edges based on their association, and sets the domain priors of the domain nodes, and the edge potentials of the edges between the domain nodes and the file nodes based on the relevant domain knowledge. The security system 120 iteratively propagates 530 the domain knowledge among the neighboring nodes in the graph through messages.

FIG. 6 illustrates a flow diagram of a process 600 for the security system 120 to iteratively propagate 530 domain knowledge among the neighboring nodes in the graph, according to one embodiment. As shown, the security system 120 generates 610 messages for each node based on the node's prior and messages received by the node during previous iterations, sends 620 the messages to the node's corresponding neighboring nodes, and receives 630 messages for the node from its neighboring nodes. The security system 120 generates 640 beliefs for each node based on the priors, the received messages, and the edge potentials associated with the edges through which the messages were received, and determines 650 whether to terminate the iteration process based on whether any predetermined stopping criterion is met. If at least one of such criteria is met, the security system 120 terminates the iteration process, otherwise it continues the process by repeating the steps 610-640 for the next iteration.

Referring back to FIG. 5, once the iteration process ends, the security system 120 labels the file nodes based on their final beliefs and classifies 540 a computer file based on the label and/or the final belief of the file node representing the computer file.

Overview of Methodology for the Security Module

FIG. 7 is a flow diagram illustrating a process 700 for the security module 115 to detect malware, according to one embodiment. Other embodiments can include different and/or additional steps than the ones described herein.

The security module 115 identifies 710 a target file residing on the client 110 (e.g., a newly-received computer file) and collects information about the file (e.g., digital signature, metadata). The security module 115 transmits 720 the collected information about the target file along with information about the client 110 (e.g., unique identifier) to the security system 120. In return, the security module 115 receives 730 classification information from the security system 120. The security module 115 determines 740 whether the target file is malicious based on the received classification information and, optionally, local security policies that specify the risk tolerance of the client 110. In addition, the determination 740 may be based on a combination of additional malware detection mechanisms, such as signature-based and behavior-based mechanisms. Based on the determination, the security module 115 enforces the applicable security policies. For example, if the target file is determined malware, the security module 115 may prohibit the target file from running, quarantine/clean/delete the target file, and/or generate a warning message.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for detecting malware and malicious websites. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A computer-implemented method for detecting malicious computer files, comprising:

generating a graph comprising nodes representing a plurality of clients and computer files residing thereon, wherein a node representing a client is connected to nodes representing computer files residing on that client through edges;

determining priors for nodes in the graph and edge potentials for edges in the graph, wherein a prior for a node representing a client comprises an assessment of a likelihood of the client getting infected by malware, a prior for a node representing a computer file comprises an assessment of a likelihood of the computer file being malware, and an edge potential reflects a relationship between nodes connected by an associated edge, and wherein the priors for nodes in the graph and the edge potentials for edges in the graph are determined based on domain knowledge;

propagating probabilities of computer files being legitimate among the nodes by transmitting messages along the edges in the graph; and determining whether a computer file is classified as malicious based on a probability associated with a corresponding node in the graph.

2. The method of claim 1, wherein determining priors for nodes in the graph comprises:

identifying a node representing a computer file known to be legitimate; and assigning a high value to a prior of the node representing the computer file known to be legitimate, wherein the high value indicates a low likelihood of the computer file being malware.

3. The method of claim 1, wherein determining priors for nodes in the graph comprises:
  identifying a node representing a computer file known to be malicious; and
  assigning a low value to a prior of the node representing the computer file known to be malicious, wherein the low value indicates a high likelihood of the computer file being malware.

4. The method of claim 1, wherein determining priors for nodes in the graph comprises:
  identifying a node representing a computer file appearing on a large number of clients; and
  assigning a high value to a prior of the node representing the computer file appearing on a large number of clients, wherein the high value indicates a low likelihood of the computer file being malware.

5. The method of claim 1, wherein determining priors for nodes in the graph comprises:
  identifying a node representing a computer file appearing on few clients; and
  assigning a low value to a prior of the node representing the computer file appearing on few clients, wherein the low value indicates a high likelihood of the computer file being malware.

6. The method of claim 1, wherein determining edge potentials for edges in the graph comprises:
  assigning a value to an edge potential for an edge between a node representing a client and a node representing a computer file that captures a homophilic machine-file relationship, wherein the homophilic machine-file relationship describes that legitimate computer files are more likely to appear on clients with good reputations and malicious computer files are more likely to appear on clients with low reputations.

7. The method of claim 1, wherein propagating probabilities of computer files being legitimate comprises:
  transmitting a message by a node along an edge in the graph, the message generated based on a prior of the node, messages received by the node, and edge potentials associated with edges the received messages were transmitted along.

8. The method of claim 1, wherein a probability of a computer file being legitimate is determined based on a prior of a node representing the computer file, messages received by the node, and edge potentials associated with edges the received messages were transmitted along.

9. The method of claim 1, wherein the propagating step iterates and terminates iterating responsive to the probability for the node converging within a predetermined threshold value.

10. The method of claim 1, wherein the propagating step iterates and terminates iterating responsive to a predetermined number of iterations having been completed.

11. The method of claim 1, wherein determining whether a computer file is classified as malicious based on a probability associated with a corresponding node in the graph comprises:
  comparing a probability associated with a node in the graph with a threshold value; and
  determining that a computer file represented by the node is malware responsive to the determination.

12. The method of claim 1, wherein the graph further comprises nodes representing a plurality of source domains hosting the computer files, wherein a node representing a source domain is connected to nodes representing computer files hosted by that source domain through edges and a prior for a node representing a source domain comprises an assessment of a likelihood for the source domain hosting malware.

13. The method of claim 12, further comprising:
  propagating a probability of a source domain being unlikely to host malware among the nodes by transmitting messages along the edges in the graph; and
  determining whether a source domain is likely to host malware based on a probability associated with a corresponding node in the graph.

14. A computer system for detecting malicious computer files, comprising:
  a processor for executing computer program code; and
  a non-transitory computer-readable storage medium storing executable computer program code, the computer program code comprising program code for:
    generating a graph comprising nodes representing a plurality of clients and computer files residing thereon, wherein a node representing a client is connected to nodes representing computer files residing on that client through edges;
    determining priors for nodes in the graph and edge potentials for edges in the graph, wherein a prior for a node representing a client comprises an assessment of a likelihood of the client getting infected by malware, a prior for a node representing a computer file comprises an assessment of a likelihood of the computer file being malware, and an edge potential reflects a relationship between nodes connected by an associated edge, and wherein the priors for nodes in the graph and the edge potentials for edges in the graph are determined based on domain knowledge;
    propagating probabilities of computer files being legitimate among the nodes by transmitting messages along the edges in the graph; and
    determining whether a computer file is classified as malicious based on a probability associated with a corresponding node in the graph.

15. The computer system of claim 14, wherein the graph further comprises nodes representing a plurality of source domains hosting the computer files, a node representing a source domain is connected to nodes representing computer files hosted by that source domain through edges, and a prior for a node representing a source domain comprises an assessment of a likelihood for the source domain hosting malware.

16. A non-transitory computer-readable storage medium encoded with executable computer program code for detecting malicious computer files, the computer program code comprising program code for:
  generating a graph comprising nodes representing a plurality of clients and computer files residing thereon, wherein a node representing a client is connected to nodes representing computer files residing on that client through edges;
  determining priors for nodes in the graph and edge potentials for edges in the graph, wherein a prior for a node representing a client comprises an assessment of a likelihood of the client getting infected by malware, a prior for a node representing a computer file comprises an assessment of a likelihood of the computer file being malware, and an edge potential reflects a relationship between nodes connected by an associated edge, and wherein the priors for nodes in the graph and the edge potentials for edges in the graph are determined based on domain knowledge;
  propagating probabilities of computer files being legitimate among the nodes by transmitting messages along the edges in the graph; and determining whether a computer file is classified as malicious based on a probability associated with a corresponding node in the graph.

17. The non-transitory computer-readable storage medium of claim 16, wherein the graph further comprises nodes representing a plurality of source domains hosting the computer files, a node representing a source domain is connected to nodes representing computer files hosted by that source domain through edges, and a prior for a node representing a source domain comprises an assessment of a likelihood for the source domain hosting malware.

\* \* \* \* \*